United States Patent [19]

Dufour et al.

[11] Patent Number: 5,509,523
[45] Date of Patent: Apr. 23, 1996

[54] APPARATUS FOR POSITIONING A PIECE OF MEAT ONTO THE SADDLE OF A TRIMMING CONVEYOR

[75] Inventors: Yvon Dufour; Jean-Guy Roy, both of Saint-Anselme; Yvon St-Onge, Sainte-Foy, all of Canada

[73] Assignee: G.-E. Leblanc Inc., Saint-Anselme, Canada

[21] Appl. No.: 306,606

[22] Filed: Sep. 15, 1994

[30] Foreign Application Priority Data

Aug. 9, 1994 [CA] Canada ................... 2129792

[51] Int. Cl.⁶ .................................................. B65G 47/24
[52] U.S. Cl. ........................................ 198/403; 198/409
[58] Field of Search .................................. 198/403, 406, 198/409, 358

[56] References Cited

U.S. PATENT DOCUMENTS

| | | | |
|---|---|---|---|
| 2,763,360 | 9/1936 | Gibson et al. | 198/409 |
| 3,235,101 | 2/1966 | Milhaupt | 198/357 X |
| 3,752,340 | 8/1973 | Willsey | 198/403 X |
| 3,871,511 | 3/1975 | Wentz et al. | 198/358 |
| 3,935,940 | 2/1976 | Wentz et al. | 198/358 |
| 4,688,980 | 8/1987 | Kikuchi et al. | 198/403 X |
| 4,874,078 | 10/1989 | Meyer | 198/409 |
| 4,924,999 | 5/1990 | Kikichi et al. | 198/409 |

FOREIGN PATENT DOCUMENTS

2012356  12/1993  Canada.

*Primary Examiner*—D. Glenn Dayoan
*Attorney, Agent, or Firm*—ROBIC

[57] ABSTRACT

An apparatus for transferring while turning upside down a piece of meat such as loins from a supply surface on which the loins are in one position to a receiving conveyor on which a plurality of saddles are mounted at regular intervals to receive the loins in another upside down position. The apparatus has an L-shaped rack for receiving the loins from the supply surface. This rack is pivotable between a stopping position and a delivering position in which its surface acts as an extension of the supply surface on which the loins may slide to reach the saddles. An inverting member is mounted onto the rack and pivotably movable therewith between the stopping and delivering positions. This inverting member is shaped and positioned in such a manner as to extend in the same plane or under the supply surface when the rack is in its stopping position in order to collect the loin that is on the supply surface, and then to cause it to turn upside down onto the receiving surface while the rack is rotating down into its delivering position.

7 Claims, 8 Drawing Sheets

APPARATUS FOR POSITIONING A PIECE OF MEAT ONTO THE SADDLE OF A TRIMMING CONVEYOR

BACKGROUND OF THE INVENTION

1. Field of the Invention

The present invention relates to an apparatus for positioning a piece of meat in a given position onto the saddle of a trimming conveyor.

In the following description, reference will be made almost exclusively to pork loins as the kind of pieces of meat that may be positioned with the apparatus. Even though the application of the apparatus according to the invention to pork loins is certainly very interesting, the invention is not and should not be understood as being restricted to the processing of such pieces of meat exclusively.

2. Brief Description of the Prior Art

In the meat processing industry, it is of common practice to subdivide into various parts the carcasses of the animals that have been slaughtered. Usually, each carcass is divided into two halves, each of which contains a loin portion.

Usually also, each loin portion is separated from the outer rib portion of the half and then passed through a fat-trimming machine called "loin puller". This machine includes a conveyor for moving the half lengthwisely past a contoured knife that is shaped and positioned in such a manner as to extract the maximum amount of lean meat, and to leave the fat. An example of such loin puller is disclosed in Applicant's Canadian patent No. 2,012,356 issued on Dec. 14, 1993. It is also of common practice to further trim manually each loin leaving the loin puller, in order to remove a maximum of fat before weighting the loin and packaging the same. Such manual trimming is carried out onto a conveyor hereinafter called "trimming" or "receiving" conveyor, on which are mounted a plurality of saddles at given intervals, each saddle being shaped and sized to receive the loin upside down. A plurality of operators manually trim the fat from the exposed surfaces of the loins positioned on the saddles while the same move with the conveyor.

So far, the positioning of the loins into the saddles of the trimming conveyor has been made manually.

OBJECT AND SUMMARY OF THE INVENTION

The object of tile present invention is to provide an apparatus especially although not exclusively devised for use with an automatic loin puller, which apparatus automatically position the loins leaving the loin puller onto the saddles of a trimming conveyor.

As the loins leave the loin puller with the bones extending up, it is compulsory to turn then upside down before positioning the same onto the saddles. The apparatus according to the invention is devised to carry out such an inversion of the loins.

More particularly, the invention as broadly claimed hereinafter is directed to an apparatus for transferring while turning upside down a piece of meat from a supply surface on which the piece of meat is in one position, to a receiving conveyor extending below said supply surface and on which a plurality of saddles are mounted at regular intervals, each saddle being sized and shaped to receive the piece of meat in another upside down position and hold it in said other position while it moves along together with the conveyor.

The apparatus according to the invention comprises an L-shaped rack for receiving the piece of meat from the supply surface. The rack comprises a receiving surface having one edge adjacent to the supply surface and rotatable about an axis extending in substantially the same plane as the supply surface. This receiving surface also has a second edge parallel to the axis and from which extends a stopping surface. The receiving and stopping surfaces together defines the L-shape of the rack.

The apparatus according to the invention also comprises actuating means for pivoting the rack about its axis between a stopping position in which its receiving surface extends upwardly and transversally to the supply surface and thus closes the same, and a delivering position in which the receiving surface extends downwardly from the supply surface towards the conveyor and thus acts as an extension of this supply surface on which the piece of meat may slide to reach the saddles. The stopping surface of the rack in the delivering position extends upwardly and thus prevents the piece of meat from falling out of the receiving surface which is long enough to extend past the saddles. The receiving and stopping surfaces are shaped to let the saddles pass and collect the piece of meat when the receiving conveyor is moving.

The apparatus according to the invention further comprises an inverting member mounted onto the rack and pivotably movable therewith between said stopping and delivering positions. This inverting member projects away from the rack in the same direction as the stopping surface and is shaped and positioned in such a manner as to extend in the same plane or under the supply surface when the rack is in its stopping position in order to collect the piece of meat that is on said supply surface, and then to cause it to turn upside down onto the receiving surface while the rack is rotating down into its delivering position.

Last of all, the apparatus according to the invention comprises control means connected to the actuating means for synchronizing the rotation of the rack as a function of the speed of the receiving conveyor and the position of the saddles along the same so that, when the rack is in its delivering position, the piece of meat from the supply surface is turned upside down, slid down along the receiving surface of said rack, and ready to be collected by one of said saddles.

Advantageously, the inverting member is rigidly connected to a carrier slidably mounted onto the receiving surface of the rack so as to be movable towards and away from the stopping surface of the rack. An actuating mechanism is then provided, which comprises at least one link having one end pivotably connected to a rigid pivot adjacent and parallel to the rotation axis of the rack, and another end pivotably connected to the slidable carrier in such a manner as to force the carrier to move towards the stopping surface and thus to move down the piece of meat when the rack is rotating towards its delivering position.

As indicated above, the apparatus according to the invention is particularly well adapted to be used to transfer pieces of meat especially pork loins from a supplying conveyor that can be part of a loin puller, to a "receiving" or "trimming" conveyor. In such case, it further comprises transferring means mounted onto the supplying conveyor for stopping each piece of meat moved along by the supplying conveyor and for pushing it out of the supplying conveyor onto the supply surface when the rack is in its stopping position. These transferring means include:

a stopping member extending across the supplying conveyor above the same to stop the piece of meat;

a ram to push the piece of meat stopped by the stopping member onto the supply surface; and auxiliary control means connected to the ram for actuating the same as the rack is in its stopping position.

The invention and its advantages will be better understood upon reading the following non-restrictive description of a preferred embodiment thereof, given with reference to the accompanying drawings.

DESCRIPTION OF A PREFERRED EMBODIMENT

The apparatus 1 according to the preferred embodiment of the invention as shown in the accompanying drawings is intended to be used especially although not exclusively to transfer pieces of meat, especially pork loins 3, from a supplying conveyor 5 that can be part of a loin puller 7, to a "receiving" or "trimming" conveyor 11 that extends transversally to the conveyor 5 below the same and moves in the direction shown with the arrow "A". More particularly, the apparatus 1 is used especially although not exclusively for automatically position the loins 3 leaving the loin puller 7 onto saddles 13 forming part of the trimming conveyor 11. As is shown, in the drawings, the saddles 13 are mounted at regular intervals along the conveyor 11 and are each sized and shaped to receive a loin in upside down position and hold it in this position while it moves along together with the trimming conveyor 11.

As the loins 3 leave the loin puller 7 with the bone apices 9 extending up, it is compulsory to turn then upside down before positioning the same onto the saddles 13. The apparatus 1 according to the invention is devised to carry out such an inversion of the loins.

More particularly, the apparatus 1 comprises an L-shaped rack 15 for receiving the loins 3 that fall from a supply surface 17 that extends close to the supplying conveyor 5. The rack 15 comprises a receiving surface 19 made of parallel rods 20 (see FIG. 8) which has one edge 21 that is adjacent to the supply surface 17 and rotatable about an axis "B" extending in substantially the same plane as the supply surface 17. The receiving surface 19 also has a second edge 23 that is parallel to the axis "B" and from which extends a stopping surface 25. The receiving and stopping surfaces 19, 25 together defines the L-shaped of the rack.

Transferring means are mounted onto the supplying conveyor 5 of the loin puller 7 for stopping each loin moved along by this supplying conveyor 5 and for pushing it out of the same onto the supply surface 17 when the rack 15 is in the position shown in FIGS. 1 to 3, which is hereinafter called "stopping position". These transferring means include an L-shaped stopping member 27 whose end 28 is in the form of a basket and extends across the supplying conveyor 5 above the same to stop each loin 3 moving along with this conveyor. The transferring means also includes a ram 29 to push the loin stopped by the stopping member 27 onto the supply surface 17. The transferring means further includes auxiliary control means of conventional structure 31 connected to the ram 29 for actuating the same as the rack 15 is in its stopping position.

Figure 1:
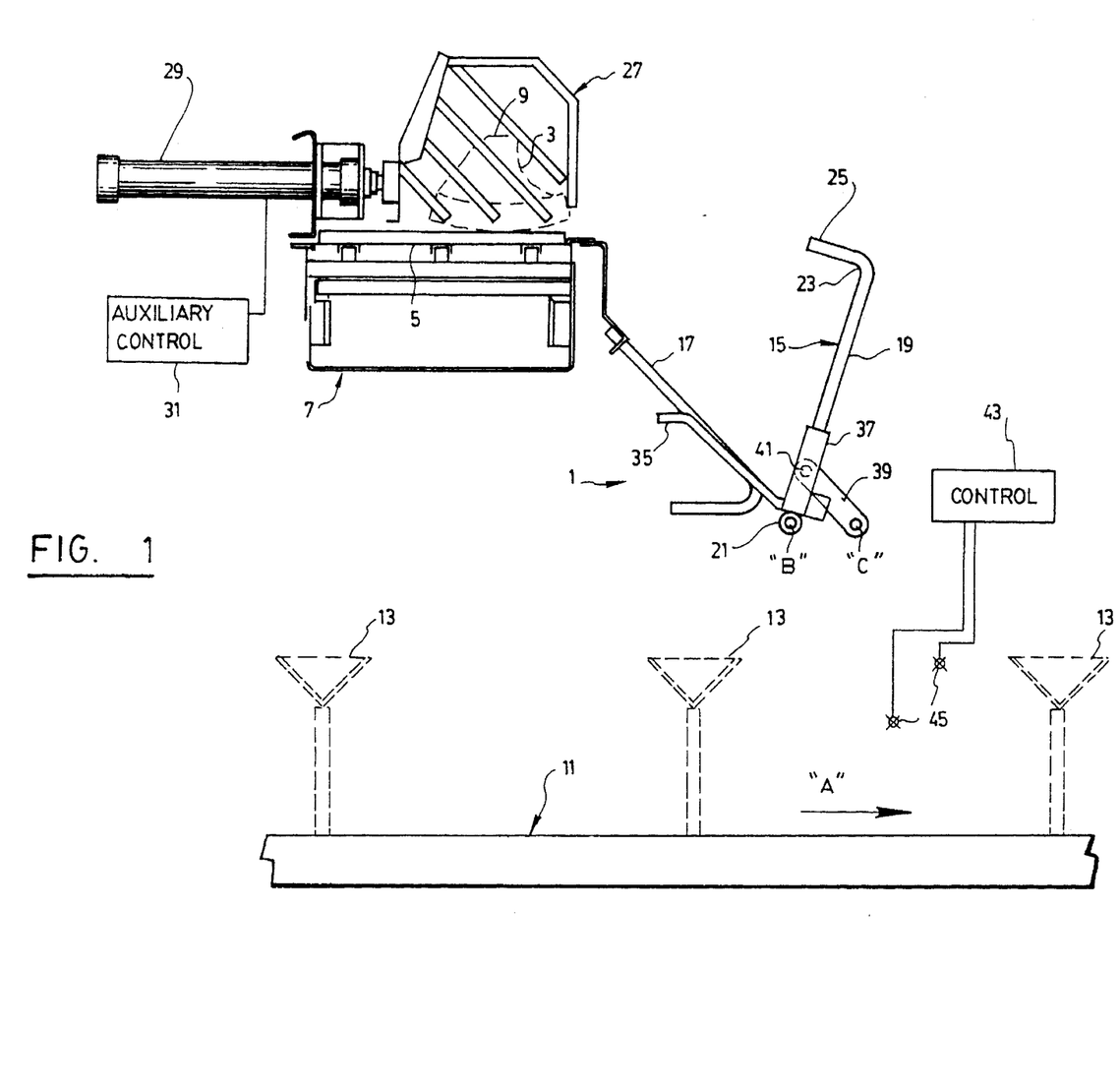
FIG. 1 is a schematic side elevational view of an apparatus according to the invention, positioned at the end of the conveyor of a loin puller above a trimming conveyor, with the rack of this apparatus in stopping position.
Figure 2:
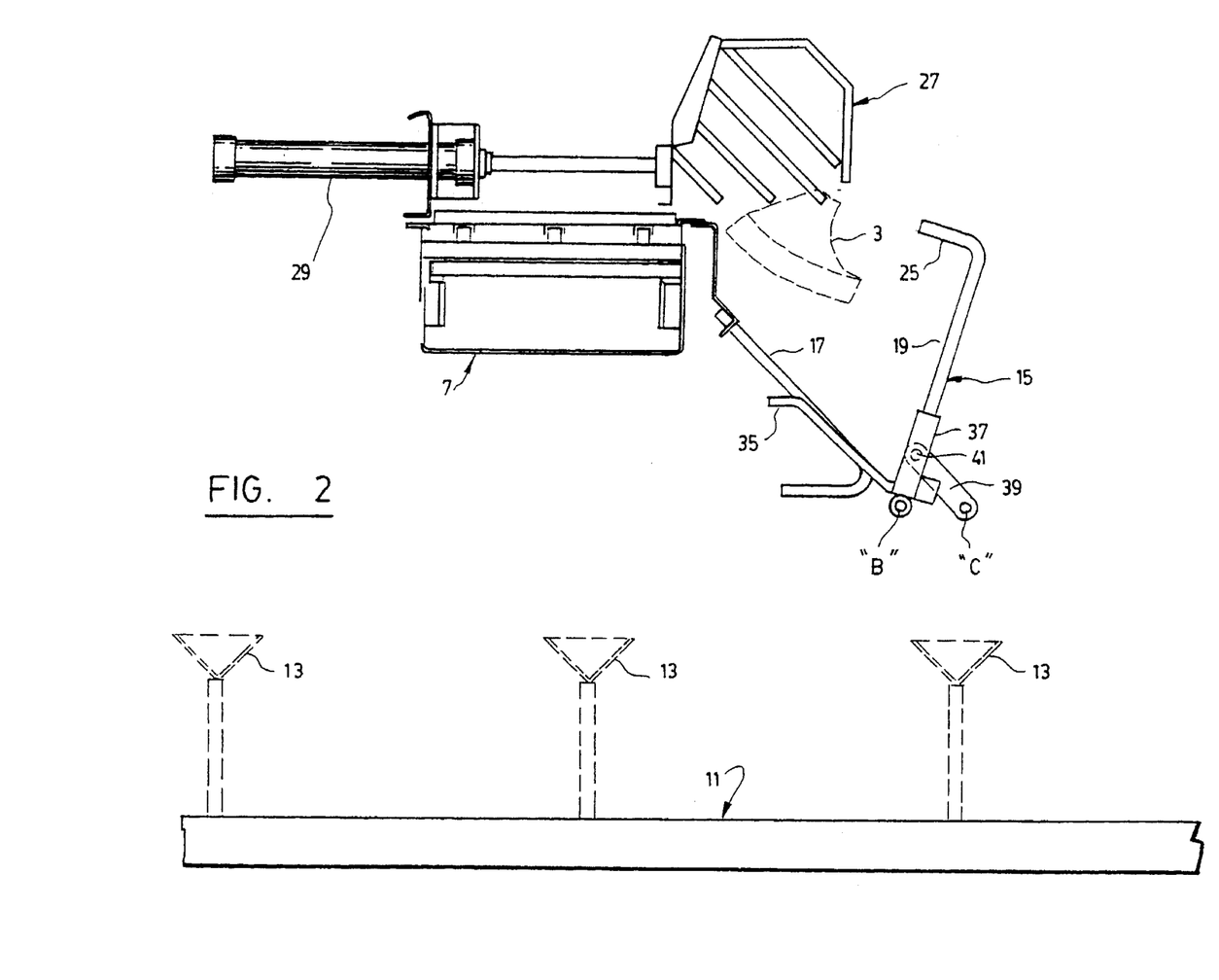
FIGS. 2 to 6 are views similar to the one of FIG. 1, showing the rack moving from its stopping position down to its delivering position.
Figure 3:
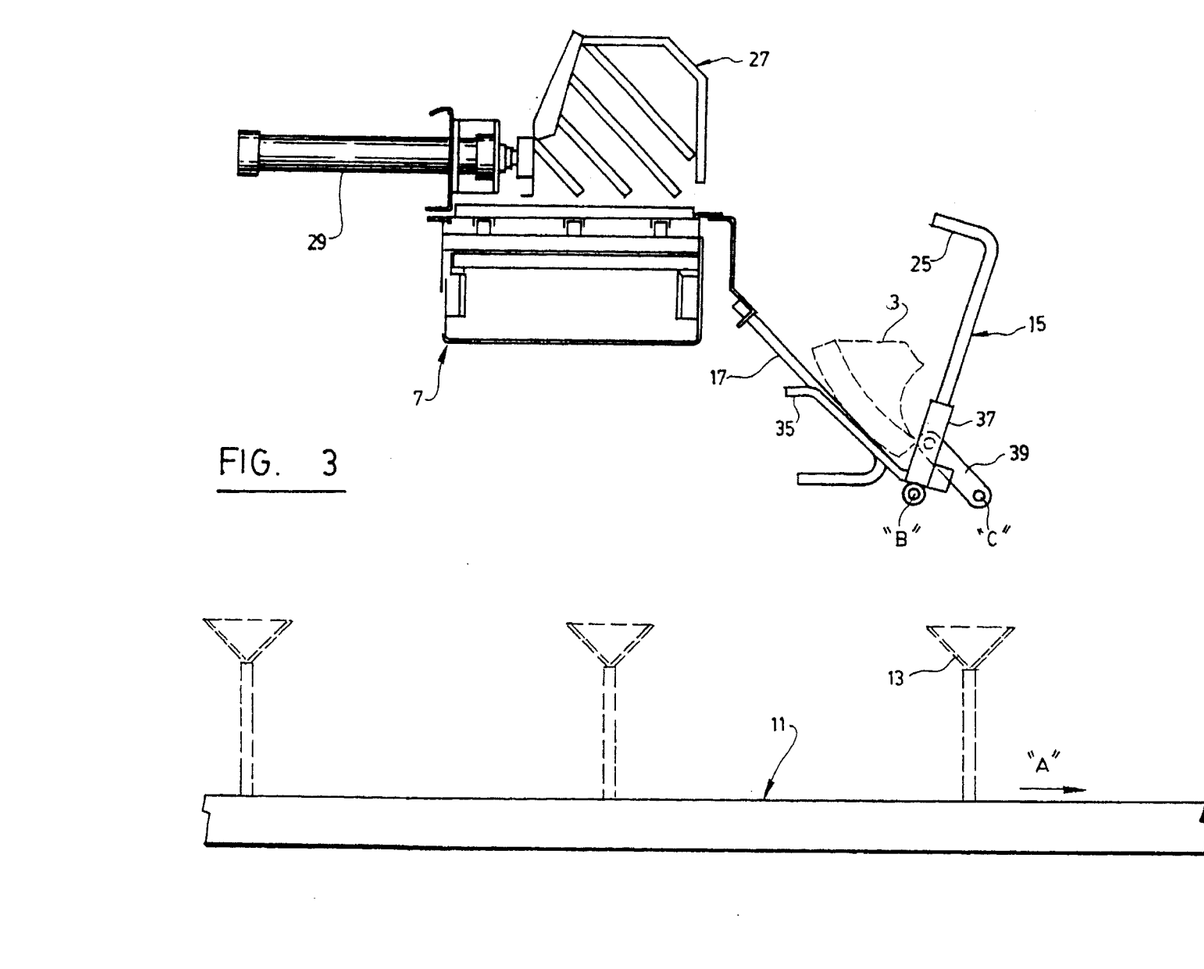
Figure 5:
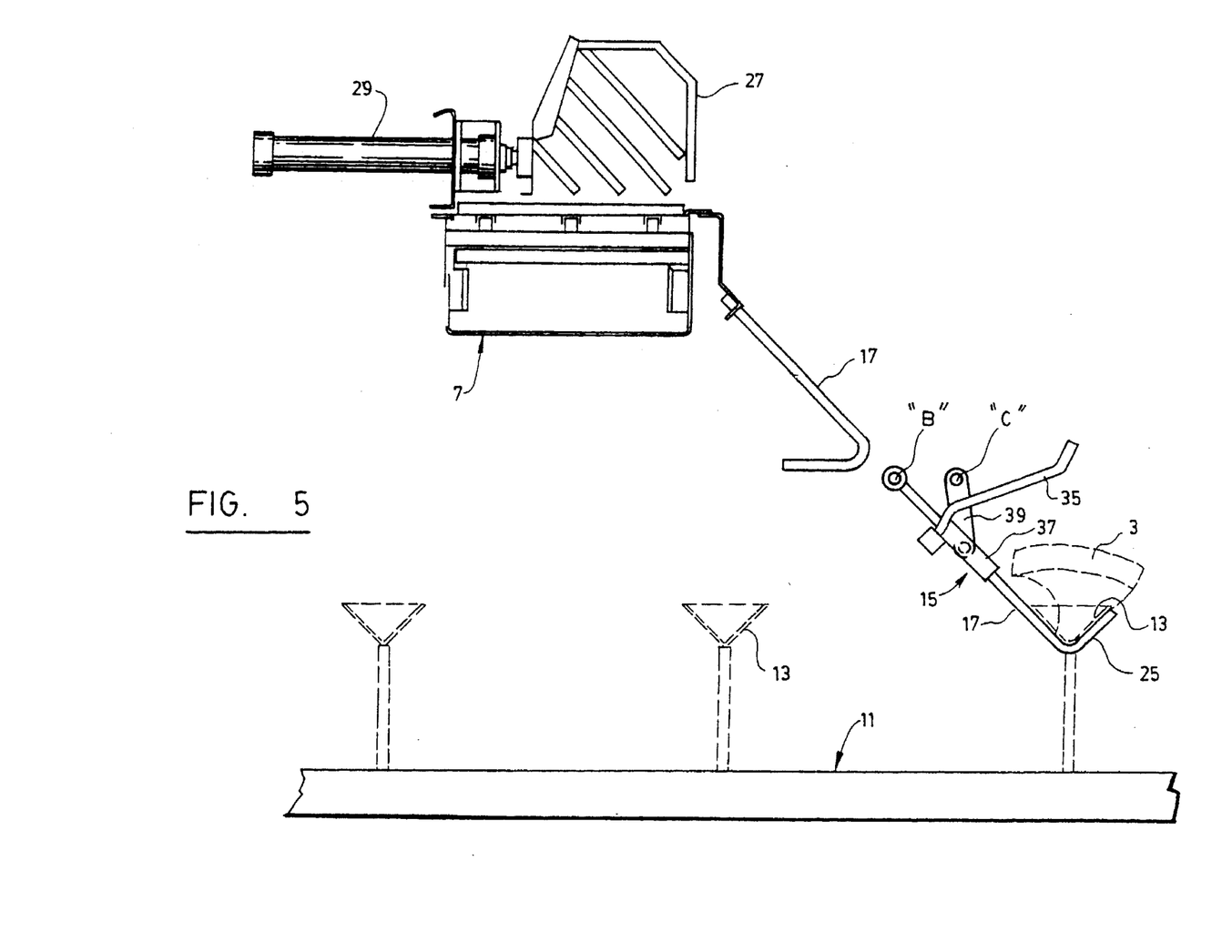
Figure 6:
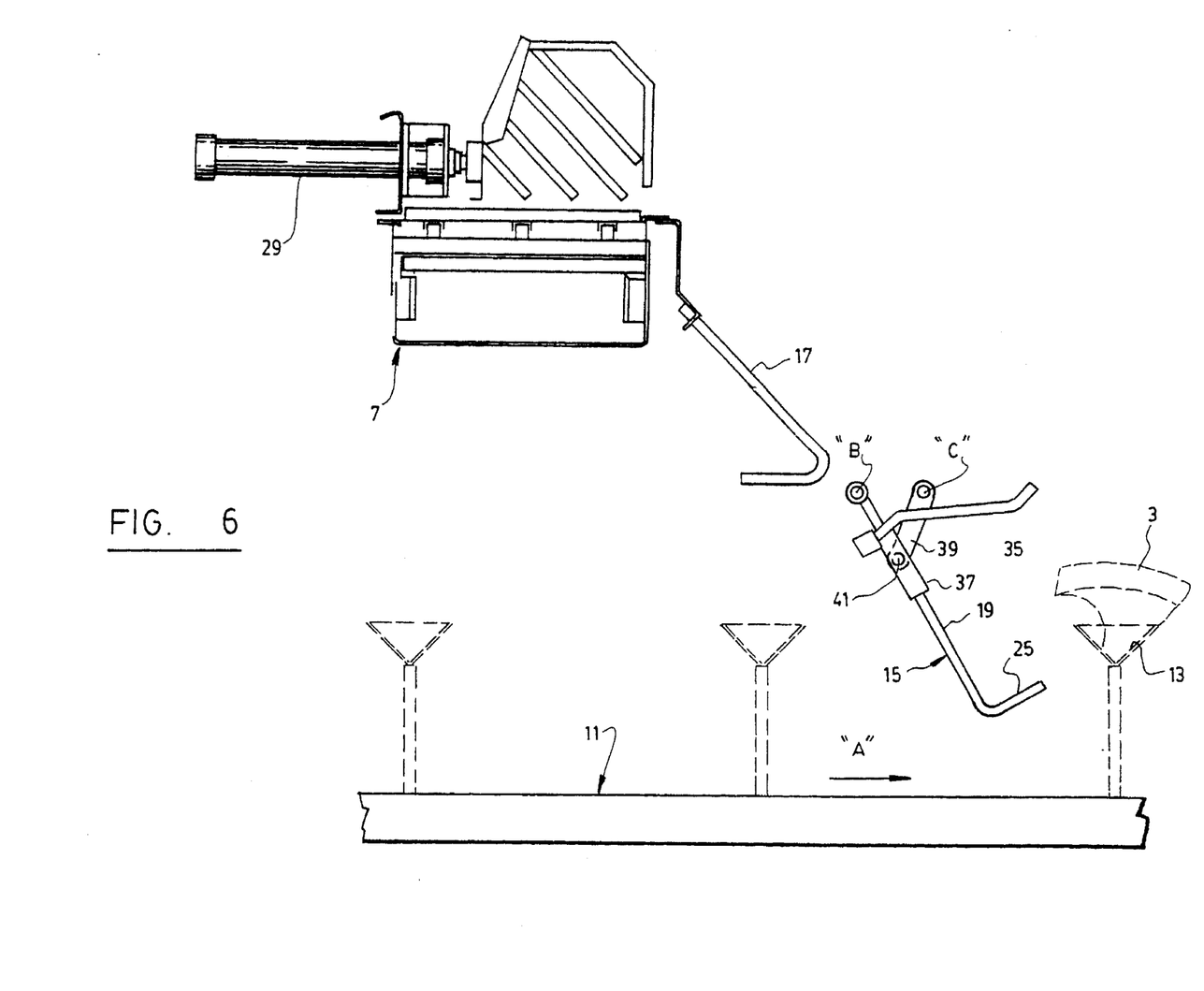
Figure 7:
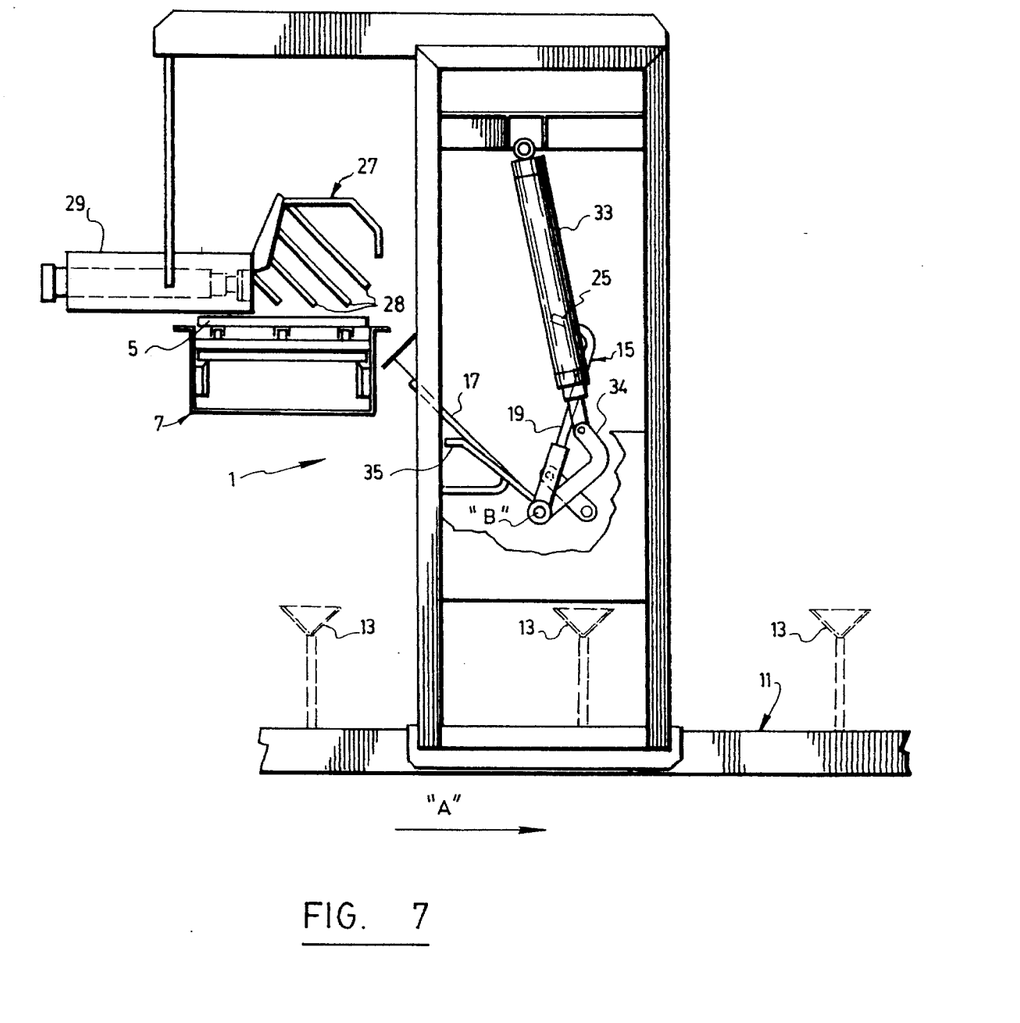
FIG. 7 is a side elevational view similar to FIG. 1, showing the structure of the apparatus according to the invention in greater details.
Figure 8:
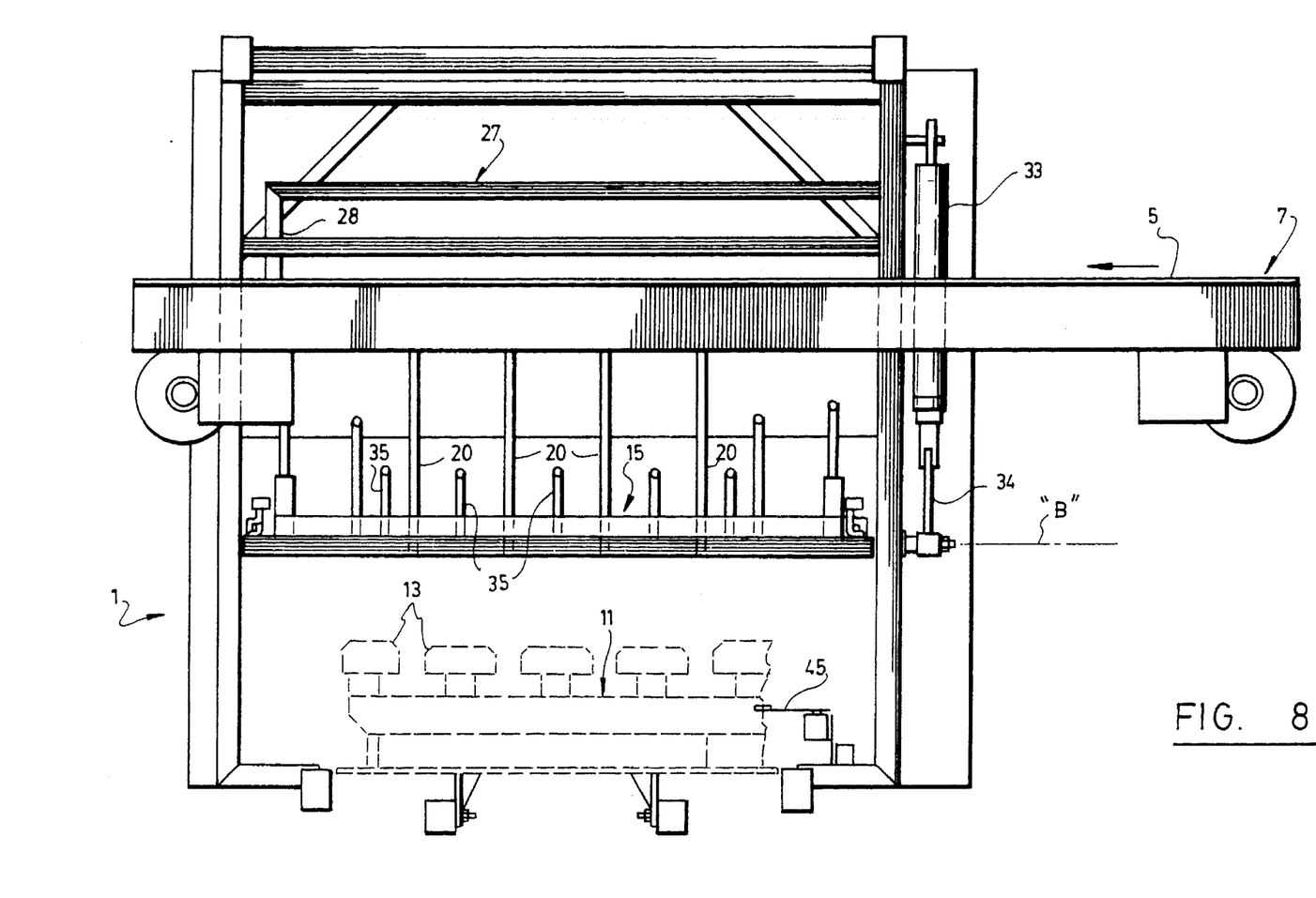
FIG. 8 is a front elevational view of the apparatus shown in FIG. 7.

The apparatus 1 according to the invention further comprises actuating means consisting of a power jack 33 connected to an actuating lever 34 (see FIG. 7) for pivoting the rack 15 about its axis between its stopping position shown in FIGS. 1 to 3 in which its receiving surface 19 extends upwardly and transversally to the supply surface 17 and thus closes the same, and a delivering position shown in FIGS. 5 and 6, in which the receiving surface 19 extends downwardly from the supply surface 17 towards the trimming conveyor 11 and thus acts as an extension of this supply surface 17 on which the loins may slide to reach the saddles 13. As is shown, the stopping surface 25 of the rack 15 in the delivering position extends upwardly and thus prevents the loin carried by the rack from falling out of the receiving surface 19 which is long enough to extend past the saddles 13. As aforesaid, the receiving and stopping surfaces 19, 25 are made of rods 20 that are positioned as shown in FIG. 8 to let the saddles 13 pass and collect the loins 3 when the receiving conveyor 11 is moving in the direction "A". These surfaces could be made differently, provided that they let the saddles 13 pass.

Figure 4:
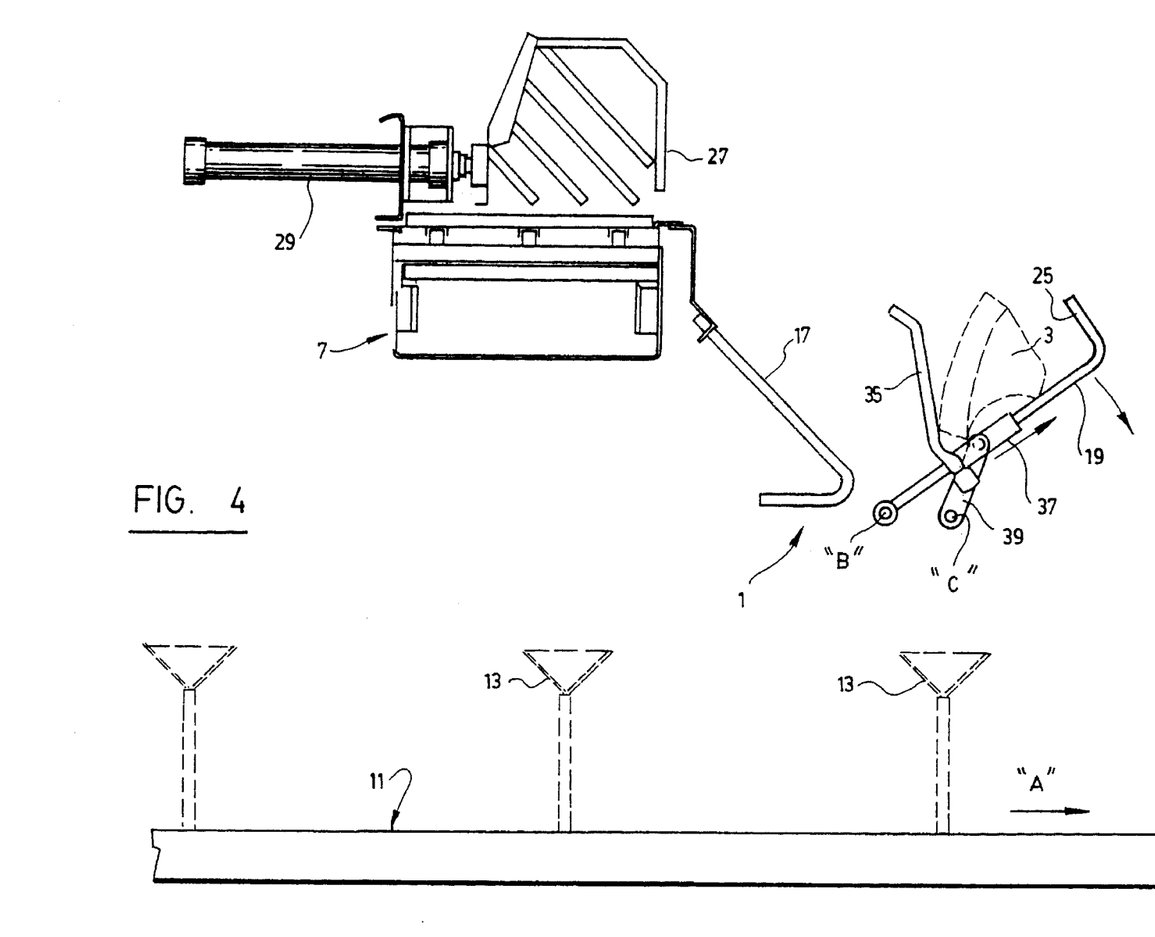

The apparatus 1 according to the invention further comprises an inverting member 35 consisting of a plurality of rods mounted onto the rack 15 and pivotably movable with the same between the stopping and delivering positions. This inverting member 35 projects away from the rack 15 in the same direction as the stoping surface 25 and is shaped and positioned 17 in such a manner as to extend in the same plane or under the supply surface 17 when the rack is in its stopping position (see FIGS. 1 to 3) in order to collect the loin 3 that is on this supply surface, and then to cause it to turn upside down onto the receiving surface 19 while the rack 15 is rotating down into its delivering position (see FIGS. 4 to 6).

As is shown, the inverting member 35 is rigidly connected to a carrier 37 that is slidably mounted onto the receiving surface 19 of the rack so as to be movable towards and away from the stopping surface 25 of this rack. An actuating mechanism is then provided, which comprises at least one link 39 having one end pivotably connected to a rigid pivot "C" adjacent and parallel to the rotation axis "B" of the rack 15, and another end 41 pivotably connected to the slidable carrier in such a manner as to force the carrier 37 to move towards the stopping surface 25 and thus to move down the loin 3 when the rack 15 is rotating towards its delivering position (see in particular FIG. 4).

Last of all, the apparatus I according to the invention comprises control means 43 (see FIG. 1 ) connected to the actuating means for synchronizing the rotation of the rack 15 as a function of the speed of the receiving conveyor 11 and the position of the saddles 13 along the same so that, when the rack 15 is in its delivering position (see FIGS. 5 and 6), the loin 3 from the supply surface 17 is turned upside down, slid down along the receiving surface 19 of said rack 15, and ready to be collected by one of the saddles 13.

These control means 43 include one or more proximity switch 45 to detect the presence of each saddle 13 that moves towards the rack 15 and to give a signal so that the actuating means 33 pivots the rack 15 and causes it to be in its delivering position to allow the detected saddle 13 to collect the loin 3 that may be carried by the receiving surface 19 of the rack 15.

The operation of the apparatus 1 according to the invention is clearly illustrated in the accompanying drawings which shows its motion from its stopping position to its delivering position. Accordingly, it is believed that such operation needs not be further described.

Of course, numerous modifications could be made to the apparatus 1 according to the invention, in particular with respect to the shape and construction of its basic elements (rack 15; control means 31, 43; transferring means 27, 29; . . . ) without departing from the scope of the present invention as defined in the appended claims.

The embodiments of the invention in which an exclusive property or privilege is claimed are defined as follows:

1. An apparatus for transferring while turning upside down a piece of meat from a supply surface on which said piece of meat is in one position to a receiving conveyor extending below said supply surface and on which a plurality of saddles are mounted at regular intervals, each saddle being sized and shaped to receive said piece of meat in another upside down position and hold it in said other position while it moves along together with said conveyor, said apparatus comprising:

an L-shaped rack for receiving said piece of meat from said supply surface, said rack comprising a receiving surface having one edge adjacent to said supply surface and rotatable about an axis extending in substantially the same plane as said supply surface, said receiving surface also having a second edge parallel to said axis and from which extends a stopping surface, said receiving and stopping surfaces together defining the L-shape of said rack;

actuating means for pivoting said rack about said axis between a stopping position in which its receiving surface extends upwardly and transversally to said supply surface and thus closes the same, and a delivering position in which said receiving surface extends downwardly from said supply surface towards said receiving conveyor and thus acts as an extension of said supply surface on which said piece of meat may slide to reach said saddles, said stopping surface of said rack in said delivering position extending upwardly and thus preventing said piece of meat from falling out of said receiving surface which is long enough to extend past said saddles, said receiving and stopping surfaces being shaped to let said saddles pass and collect said piece of meat when the receiving conveyor is moving;

an inverting member mounted onto said rack and pivotably movable therewith between said stopping and delivering positions, said inverting member projecting away from said rack in the same direction as said stopping surface and being shaped and positioned in such a manner as to extend in the same plane or under said supply surface when the rack is in its stopping position in order to collect the piece of meat that is on said supply surface, and then to cause it to turn upside down onto the receiving surface while the rack is rotating down into its delivering position; and control means connected to the actuating means for synchronizing the rotation of the rack as a function of the speed of the receiving conveyor and the position of the saddles along the same so that, when said rack is in its delivering position, the piece of meat from the supply surface is turned upside down, slid down along the receiving surface of said rack, and ready to be collected by one of said saddles.

2. The apparatus of claim 1, wherein said control means includes at least one proximity switch to detect the presence of each saddle that moves towards the rack and to give a signal to the actuating means so that said actuating means pivots said rack and causes it to be in its delivering position to allow the detected saddle to collect the piece of meat that may be carried by the receiving surface of said rack.

3. The apparatus of claim 1, wherein:

said inverting member is rigidly connected to a carrier slidably mounted onto the receiving surface of said rack so as to be movable towards and away from the stopping surface of said rack; and an actuating mechanism is provided, which comprises at least one link having one end pivotably connected to a rigid pivot adjacent and parallel to the rotation axis of the rack, and another end pivotably connected to the slidable carrier in such a manner as to force said carrier to move towards said stopping surface and thus to move down the piece of meat when the rack is rotating towards its delivering position.

4. The apparatus of claim 1 for use to transfer pieces of meat from a supplying conveyor to said receiving conveyor, further comprising:

transferring means mounted onto said supplying conveyor for stopping each piece of meat moved along by said supplying conveyor and for pushing it out of said supplying conveyor onto said supply surface when said rack is in its stopping position, said transferring means including:

a stopping member extending across said supplying conveyor above the same to stop said piece of meat;

a ram to push the piece of meat stopped by said stopping member onto said supply surface; and auxiliary control means connected to the ram for actuating the same as the rack is in its stopping position.

5. The apparatus of claim 4, wherein said control means includes at least one proximity switch to detect the presence of each saddle that moves towards the rack and to give a signal to the actuating means so that said actuating means pivots said rack and causes it to be in its delivering position to allow the detected saddle to collect the piece of meat that may be carried by the receiving surface of said rack.

6. The apparatus of claim 5, wherein:

said inverting member is rigidly connected to a carrier slidably mounted onto the receiving surface of said rack so as to be movable towards and away from the stopping surface of said rack; and an actuating mechanism is provided, which comprises at least one link having one end pivotably connected to a rigid pivot adjacent and parallel to the rotation axis of the rack, and another end pivotably connected to the slidable carrier in such a manner as to force said carrier to move towards said stopping surface and thus to move down the piece of meat when the rack is rotating towards its delivering position.

7. The apparatus of claim 6, wherein the supplying conveyor is part of an automatic loin puller.

* * * * *